UNITED STATES PATENT OFFICE.

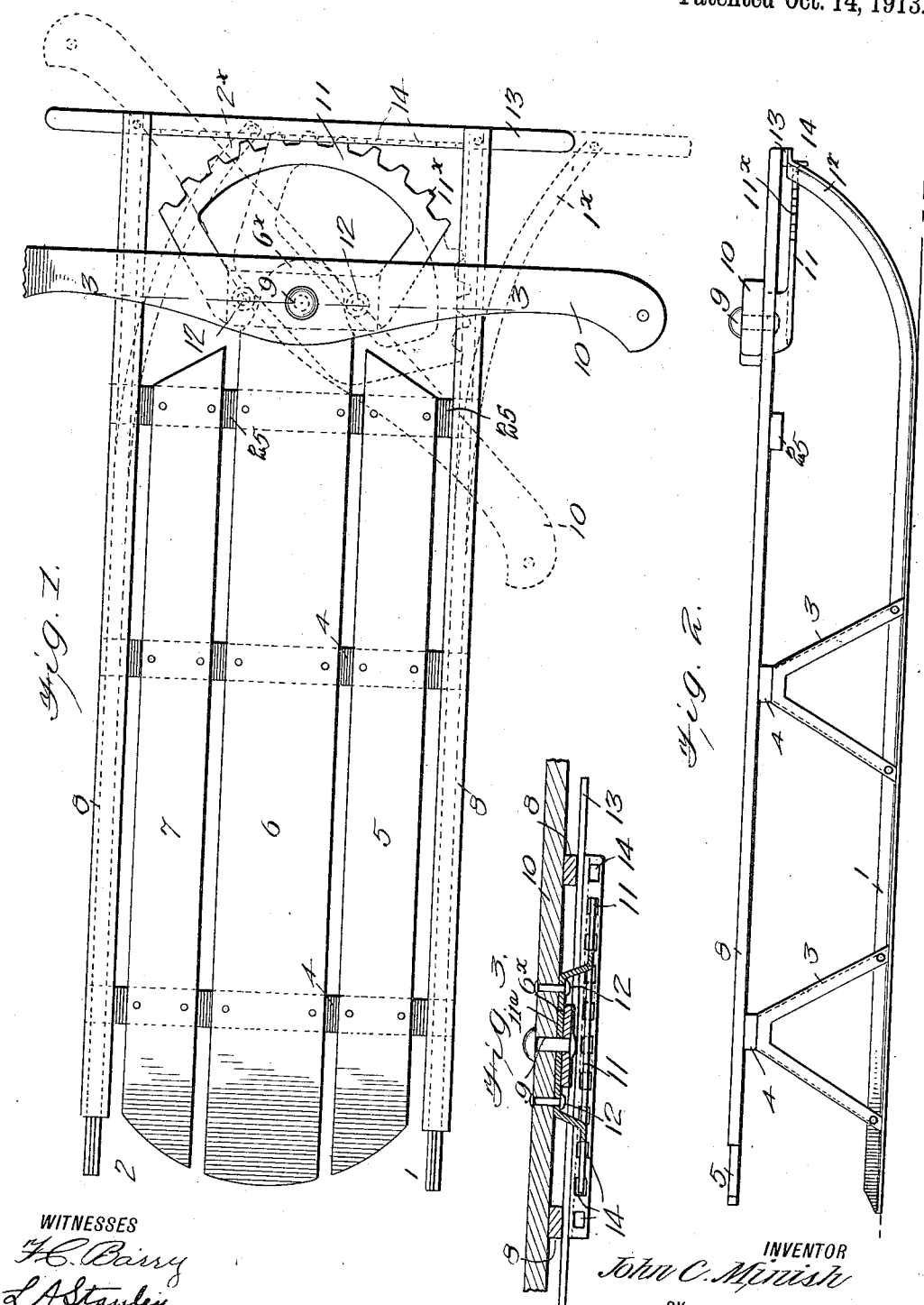

JOHN C. MINISH, OF RIDGWAY, PENNSYLVANIA.

FLEXIBLE SLED.

1,075,846.  Specification of Letters Patent.  Patented Oct. 14, 1913.

Application filed September 16, 1912.  Serial No. 720,564.

*To all whom it may concern:*

Be it known that I, JOHN C. MINISH, a citizen of the United States, and a resident of Ridgway, in the county of Elk and State of Pennsylvania, have made certain new and useful Improvements in Flexible Sleds, of which the following is a specification.

My invention relates to improvements in flexible hand sleds, and it consists in the combinations, constructions and arrangements herein described and claimed.

An object of my invention is to provide a sled having a positive steering apparatus so as to facilitate the taking of sharp curves.

A further object of my invention is to improve the general construction of sleds of this type with particular regard for minimizing the number of parts.

Other objects and advantages will appear in the following specification, and the novel features of the device will be particularly pointed out in the appended claims.

My invention is illustrated in the accompanying drawings forming part of this application in which—

Figure 1 is a plan view of the device. Fig. 2 is a side view, and Fig. 3 is a section along the line 3—3 of Fig. 1.

In carrying out my invention I provide the runners 1 and 2, which are preferably of steel. Secured to these runners on each side of the sled are the uprights 3, as shown in Fig. 2. At the top of these uprights are cross pieces 4. Secured to the tops of the cross pieces are the sled boards 5, 6 and 7 respectively. On opposite sides of the sled are two strips 8, which are preferably made of wood. These strips 8 are also secured to the cross members 4. A brace 5 is secured to both of the strips 8, and also to the sled boards 5, 6 and 7. The central board 6 is prolonged and forms an extension $6^x$ through which passes a pivot pin 9 of a steering bar 10.

A segment 11 provided with teeth $11^x$ has a U-shaped portion $11^a$ which is secured to the bottom of the steering bar 10 by any suitable means such as rivets 12. The extension $6^x$ lies underneath this U-shaped portion $11^a$ of the segment 11 as shown in Fig. 3. The thickness of the extension $6^x$ and the U-shaped portion $11^a$ is substantially equal to the thickness of the strips 8.

The strips 8 surmount the rack bar 13 at their forward ends. The latter is provided with openings 14 arranged to receive teeth $11^x$ on the segment 11. The front portions $1^x$ and $2^x$ of the runners 1 and 2 are curved upwardly and are secured to the rod 13.

From the foregoing description of the various parts of the device the operation thereof may be readily understood.

When it is desired to turn the sled to the right or to the left pressure is exerted on the steering bar 10 so as to move it into the dotted line position shown in Fig. 1. This causes the segment 11 to rotate about the pivot pin 9 and to cause a lateral shifting of the rod or bar 13, thereby flexing the runners $1^x$ and $2^x$, as shown in Fig. 1. It will be understood that the curvature of the runners in this figure is greatly exaggerated. This is for the purpose of illustration. As the bar 13 moves laterally it is kept in mesh with the segment 11 by means of the side members 8 underneath which the bar 13 slides. This construction provides an exceedingly simple yet powerful means for flexing the runners, so that sharp curves may be taken with a minimum expenditure of effort.

I claim:

1. In a flexible sled, a frame comprising top boards, supports for said top boards, runners secured to said supports, a segment pivotally secured above the central one of said top boards, a steering lever secured above said central top board, a rack bar arranged to connect the front end of the flexible runners together, said rack bar being arranged to mesh with the teeth on said segment, and means for connecting the segment and the steering lever rigidly together.

2. In a flexible sled, a pair of flexible runners, supports secured thereto, cross pieces carried by said supports, top sled boards mounted on said cross pieces, side strips also mounted on said cross pieces, the central one of said top boards being extended, a segmental gear having a portion disposed above said extension, a steering lever having a portion disposed above said central extension, a common pivot pin for said lever and said segmental gear, means for rigidly securing said lever to said gear, a rack member connected to the ends of the flexible runners, said rack member being arranged to mesh with said segmental gear, and being arranged to slide underneath the ends of said side strips.

3. In a flexible sled, a pair of flexible runners, supports secured thereto, cross pieces carried by said supports, top sled boards mounted on said cross pieces, side strips also mounted on said cross pieces, the central one of said top boards being extended, a segmental gear having a U-shaped portion arranged to overlie said central extension, a steering lever disposed above said U-shaped portion, a pivot pin passing through said extension, said U-shaped portion and said steering lever for holding these parts together, means for rigidly connecting said U-shaped portion with said steering lever, a rack, and members secured to the ends of the flexible runners, said rack member being arranged to mesh with said segmental gear.

4. In a flexible sled, a pair of flexible runners, supports secured thereto, cross pieces carried by said supports, top sled boards mounted on said cross pieces, side strips also mounted on said cross pieces, the central one of said top boards being extended, a segmental gear having a U-shaped portion arranged to overlie said central extension, a steering lever disposed above said U-shaped portion, a pivot pin passing through said extension, said U-shaped portion and said steering lever for holding these parts together, means for rigidly connecting said U-shaped portion with said steering lever, a rack, and members secured to the ends of the flexible runners, said rack members being arranged to mesh with said segmental gear, said rack being guided by the engagement of the ends of the rack with the bottom portion of said side members.

JOHN C. MINISH.

Witnesses:
JAMES H. ALLISON,
D. MERLE JENKS.

---

Copies of this patent may be obtained for five cents each, by addressing the "Commissioner of Patents, Washington, D. C."